(12) United States Patent
Trevor et al.

(10) Patent No.: US 7,680,939 B2
(45) Date of Patent: Mar. 16, 2010

(54) GRAPHICAL USER INTERFACE TO MANIPULATE SYNDICATION DATA FEEDS

(75) Inventors: Jonathan James Trevor, Santa Clara, CA (US); Daniel Joseph Raffel, San Francisco, CA (US); Pasha Sadri, Menlo Park, CA (US); Edward Ho, San Jose, CA (US); Kevin Cheng, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 588 days.

(21) Appl. No.: 11/613,960

(22) Filed: Dec. 20, 2006

(65) Prior Publication Data

US 2008/0155440 A1  Jun. 26, 2008

(51) Int. Cl.
*G06F 3/048* (2006.01)
(52) U.S. Cl. .................. 709/226; 717/104; 715/772
(58) Field of Classification Search .......... 709/201, 709/203, 206, 217–219, 250, 226; 717/104; 715/772
See application file for complete search history.

(56) References Cited

U.S. PATENT DOCUMENTS 7,519,917 B2 *  4/2009  Lewis-Bowen et al. ..... 715/772
2004/0056908 A1  3/2004  Bjornson et al.
2005/0160398 A1 *  7/2005  Bjornson et al. ............ 717/104

OTHER PUBLICATIONS

U.S. Appl. No. 11/749,683, filed May 16, 2007.
U.S. Appl. No. 11/934,594, filed Nov. 2, 2007.

* cited by examiner

*Primary Examiner*—Wing F Chan
*Assistant Examiner*—Ruolei Zong
(74) *Attorney, Agent, or Firm*—Weaver Austin Villeneuve & Sampson LLP

(57) ABSTRACT

A pipe specification editor is provided to configure a plurality of modules for processing a syndication data feed. The editor is operable to provide a graphical user interface to receive a user specification of a plurality of modules and to receive a user specification of wires. Each module is characterized by at least one of a group consisting of an input node and an output node, wherein the input node, if present, is configured to input a syndication data feed and the output node, if present, is configured to output a syndication data feed. At least one of the modules is a module configured to retrieve a source syndication data feed. The wires are configured to provide a syndication data feed provided from an output node of a module to an input node of another module.

36 Claims, 10 Drawing Sheets

1200

GRAPHICAL USER INTERFACE TO MANIPULATE SYNDICATION DATA FEEDS

BACKGROUND

Subscribing to web site syndication feeds is a popular mechanism for users to receive information about web pages in an efficient manner. In general, syndication data for a web page is data that represents the content of the web page and may even be identical in content to the content of the web page, but is not itself the content of the web page. The syndication data is available to syndication-aware programs that subscribe to a "feed" of the syndication data. The syndication data is typically designed to be machine-readable for efficient processing (e.g., into human-readable form). For example, the syndication data is typically XML-based or otherwise structured to ensure or enhance the machine-readability.

A typical use of syndication data is by subscription via a syndication feed aggregation service, which combines the contents of multiple syndication feeds for display on a single screen or series of screens. Examples of syndication data include data formatted according to standards such as past, current and to-be promulgated versions of RSS and Atom. While RSS and Atom are popular syndication data formatting standards, there are (and, in high probability, will be) other standards for syndication data formatting.

The syndication feed content for a data item typically includes a human-readable description of the data item, where the human-readable description is "clickable" to the web page URL so that the user can easily view the corresponding underlying web page content. In addition, an aggregation service may operate to aggregate syndication feed content to provide to an end user. For example, this may provide a marketing mechanism for a service provider, such as a real estate agent, to keep potential clients coming back to his web site.

SUMMARY

In accordance with an aspect, a pipe specification editor computer program product is provided to configure a plurality of modules for processing a syndication data feed. The editor computer program product comprising a computer readable medium having computer program instructions stored therein which are operable to configure one or more computing devices to provide a graphical user interface to receive a user specification of a plurality of modules and to receive a user specification of wires.

Each module is characterized by at least one of a group consisting of an input node and an output node, wherein the input node, if present, is configured to input a syndication data feed and the output node, which is generally present, is configured to output a syndication data feed. At least one of the modules is a module configured to retrieve a source syndication data feed. The wires are configured to provide a syndication data feed provided from an output node of a module to an input node of another module.

The computer program instructions are further operable to configure the one or more computing devices to save, as at least a portion of a pipe specification, an indication of the user specification of modules and wires.

In accordance with another aspect, at least one computer readable medium is provided having tangibly embodied therein a collection of computer-readable pipe specifications.

In accordance with yet another aspect, a computer program product is provided including computer program instructions operable to cause at least one computing device to interpret instructions corresponding to module specifications and at least one wire specification which a pipe specification and to execute instructions corresponding to the interpreted instructions.

DETAILED DESCRIPTION

The inventors have realized a desirability to ease the process by which one may effect the remixing of syndication data feeds and, furthermore, to create syndication feed data "mashups" to combine content from more than one source, including at least one syndication data feed, into an integrated experience.

In accordance with an example, a graphical user interface environment is provided to enhance the publication of syndication data feed content to create a data "pipe" of modules. In one example, the environment is provided as a hosted service accessible via a network such as the internet (e.g., using a web browser). For example, the service may include three primary interfaces—a pipes editor, a pipes browser and hosted pipes.

We first discuss modules, which are basic building blocks of a pipe. Most modules are configured to perform a simple, specific task. One such module is a "fetch" module, which is configured to, when execute, retrieve a syndication data feed (such as according to an Atom or RSS protocol) from a location indicated by a locater, such as a feed URL. It is possible for some examples of fetch modules to retrieve more than one syndication data feed.

Figure 1:
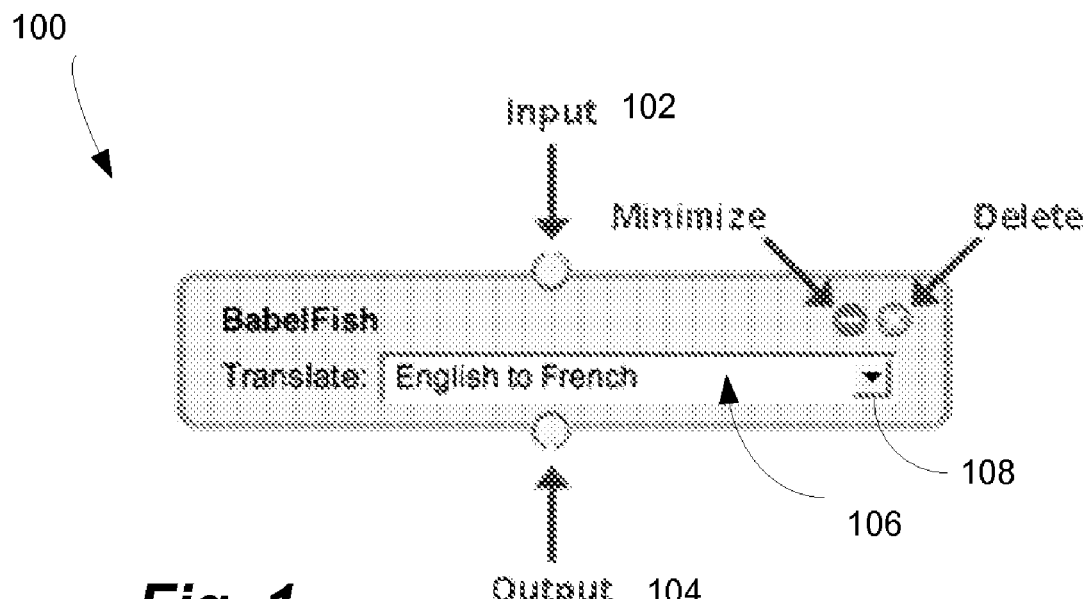
FIG. 1 illustrates an example of a module usable in the processing of syndication data.

A module may include an input and/or an output. FIG. 1 illustrates an example of a module 100 (of course, FIG. 1 actually illustrates a graphical representation of a module), to access a "BabelFish" service. In the FIG. 1 example, the module 100 is configured to translate syndication data feed content arriving at an input node 102 of the module 100 in English, into syndication data feed content provided at an output node 104 of the module 100 in French. It is noted that the FIG. 1 module 100 is configurable by an input field 106 that may be defined by use of a pull-down menu accessible using an arrow 108. In some examples, discussed later, a module may even be defined in terms of a pipe.

Figure 9:
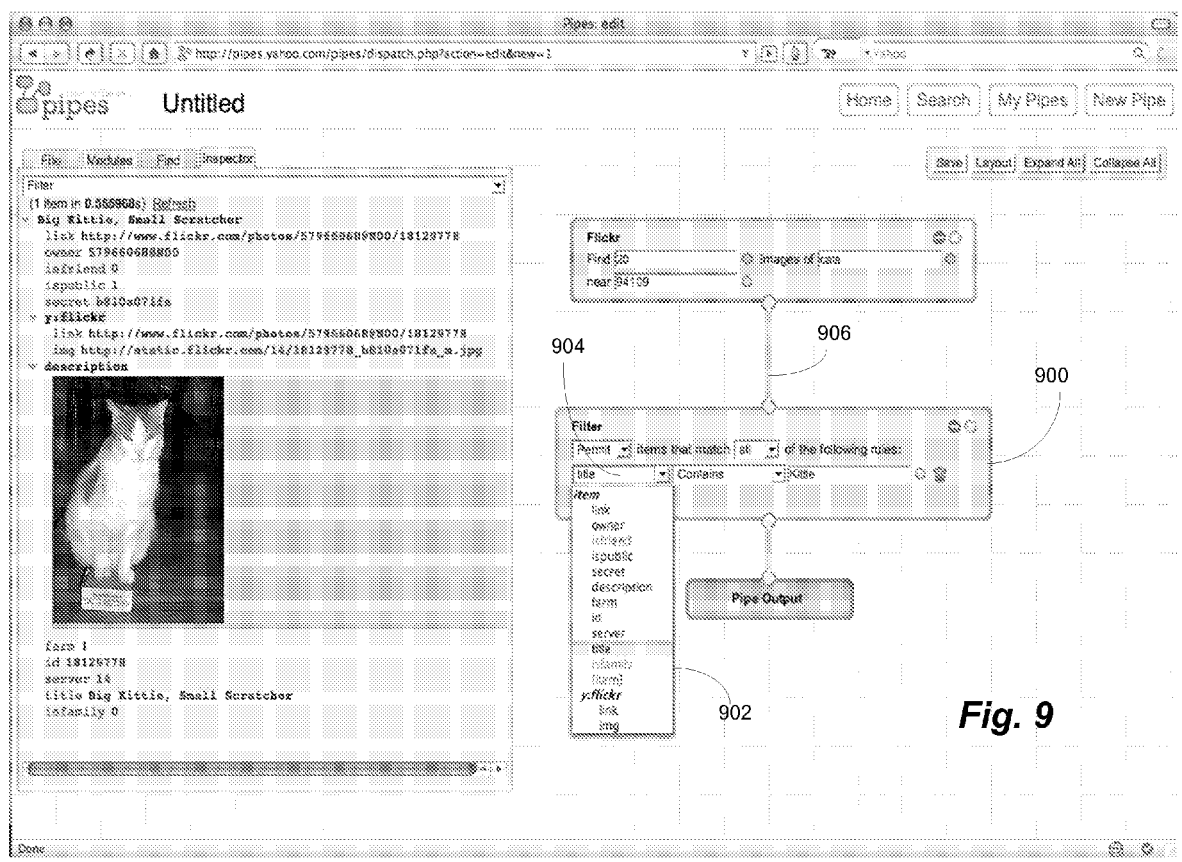
FIG. 9 illustrates an example of a module that includes a pull-down menu to configure a user input field of the module, where content of the menu is indicative of syndication data feed items being provided to the module via a wire.

Module settings, in general, may be configured in various ways. In one example, an input field may be provided via which a user can manually enter a string. When there are multiple options for an input field of a module, a pull down or other type of menu may be provided. Menus in some examples are dynamic in nature, with the content in the menu changing based on the input syndication feed data to that module. For example, FIG. 9 illustrates an example of a module 900 that includes a pull-down menu 902 to configure a user input field 904 of the module 900, where content of the menu 902 is indicative of syndication data feed items being provided to the module via a wire 906. An example of another option to deliver a parameter for a module setting is to use a user input module. An example of a user input module, which is a special purpose module to provide user input to an input field of another module, is described in greater detail below with reference to FIG. 5. It is noted that many of the characteristics of the example module 100 may be common to all modules.

The FIG. 1 module 100 is a "process" module—it processes the input syndication data and, based thereon, provides output syndication data. Other module types are "data source," "analyze," "utility" and "user input." Examples of these other module types will be seen throughout this description. It will later be seen that a pipe itself may be a module type.

The modules may be available from a library of modules that may be, for example, similar to a library of shapes provided by a drawing program, but where the modules define functionality that can be "executed." In some examples, graphic representations of the library modules are displayed and can be "dragged" from the library display onto a canvas of the pipes editor. The library modules may be categorized and accessible via menus, search tools, etc.

Figure 2:
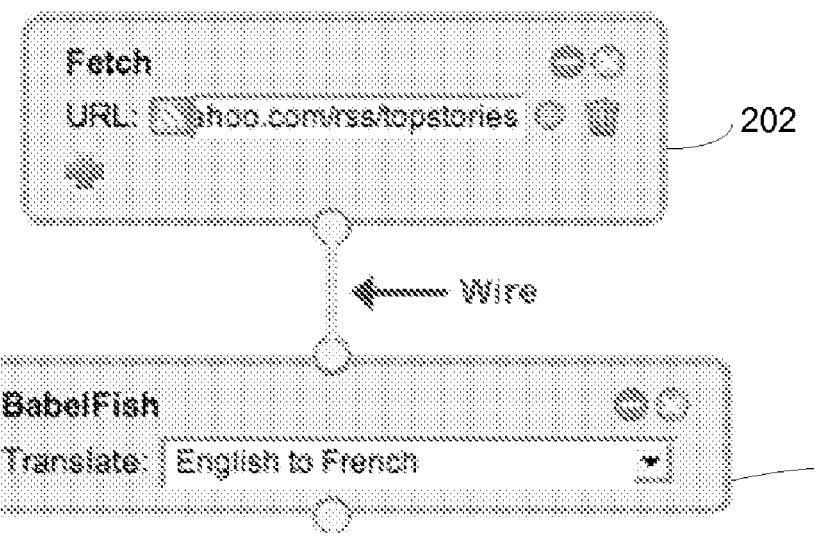
FIG. 2 illustrates an example including a fetch module.
Figure 3:
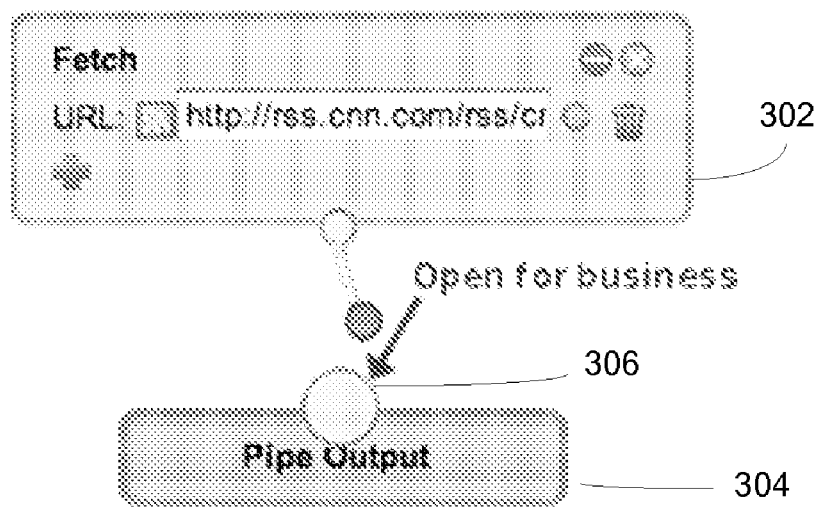
FIG. 3 illustrates wiring together a data-providing module to a nominally data-accepting module.

As illustrated in FIG. 2, a user may interact with the pipes editor to cause modules to be connected using wires. Using the graphical user interface, the output of a module may be "dragged" to the input of another module, to wire a one-way data connection between the two modules. FIG. 2 illustrates an example of a fetch module 202 (described in greater detail later), which is an example of a data source module, wired to a BabelFish module 204 (such as described above with reference to FIG. 1), which is an example of a process module. As illustrated in FIG. 3, in one example, when it is attempted to wire together a data-providing module 302 to a nominally data-accepting module 304, the input terminal 306 of the data-accepting module 304 enlarges or otherwise indicates that it can accept the output from the data providing module 302. The wire between two modules carries the data output from one module, as processed by that module, and input to the other module.

Figure 4:
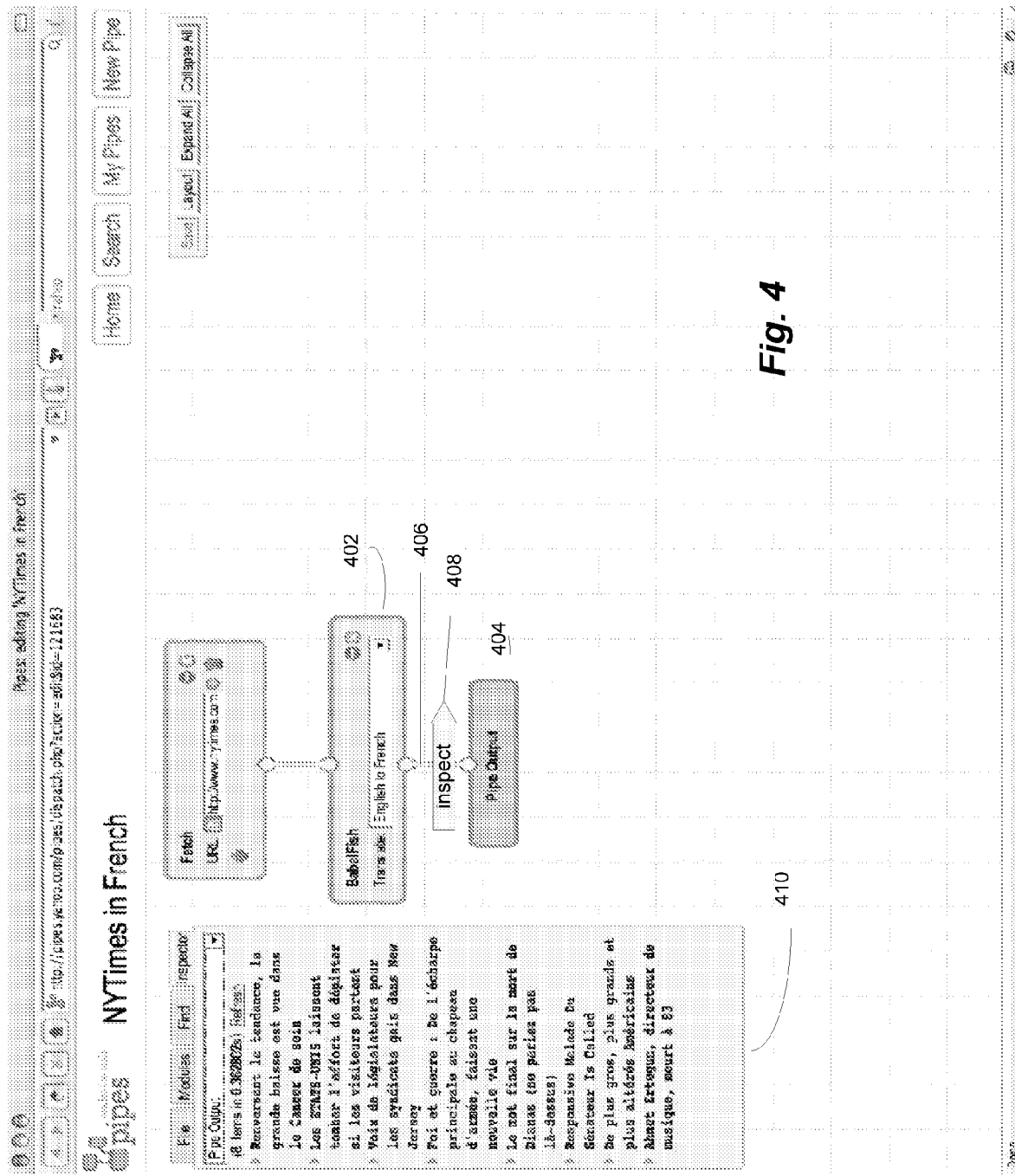
FIG. 4 illustrates a facility to inspect the syndication feed data that is being passed between two modules.

As illustrated in FIG. 4, facility may be provided to inspect the syndication feed data that is being passed between two modules (in FIG. 4, between the data providing module 402 and the data accepting module 404) over a wire (in FIG. 4, over the wire 406). In particular, FIG. 4 illustrates an "inspector button" 408 which, when selected, causes information of the syndication feed data being passed over the wire 406 to be displayed, e.g., in a display pane 410 of the editor. The information may be indicative, for example, of "live" data being passed over the wire 406.

Figure 10:
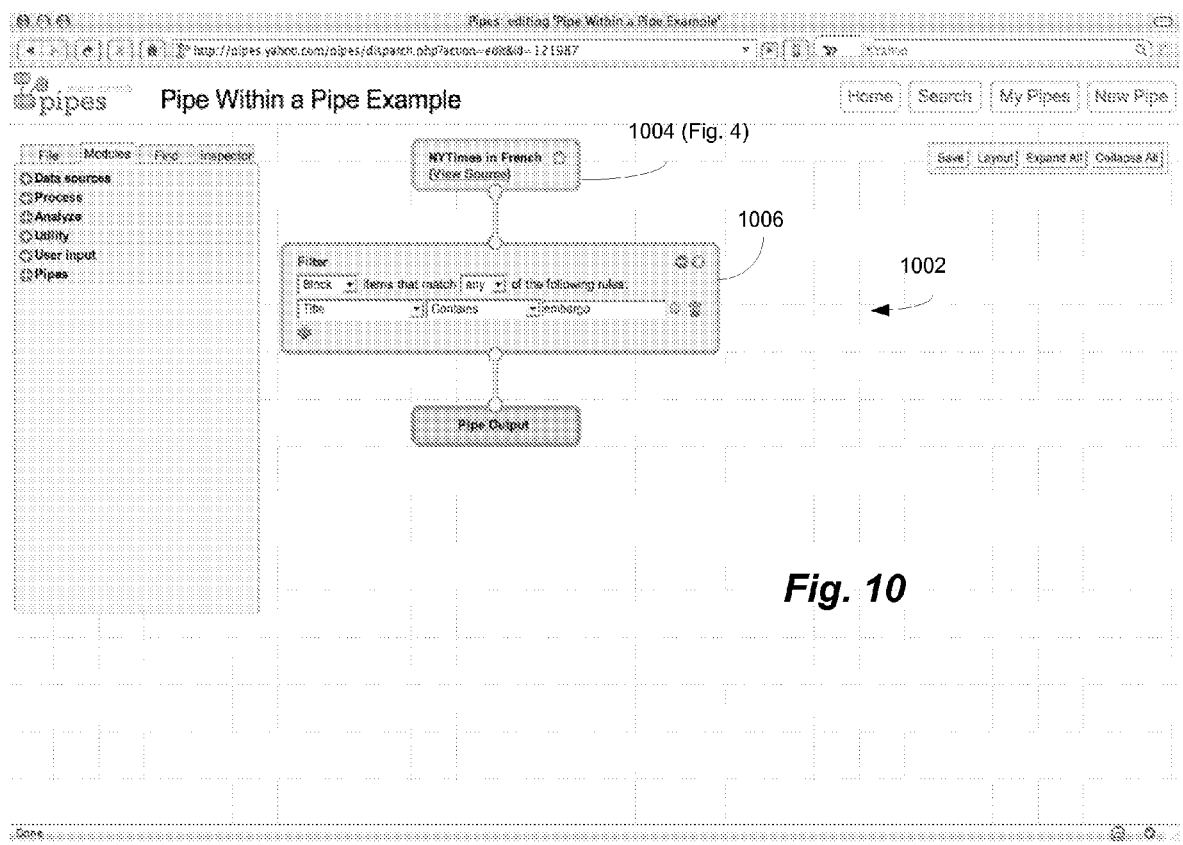
FIG. 10 illustrates an example of a module that includes a pipe within it.

In addition to inspecting syndication feed data being passed over a wire, facility may also be provided to inspect functionality associated with a module. For example, FIG. 10 illustrates an example of a module 1002 that includes a pipe 1004 within it. The pipe 1004 provides input to the module 1006. The pipe 1004 may be one or more modules and/or pipes. Furthermore, facility may even be provided to edit a module or pipe of a pipe being edited, via another instance of the editor that may be, for example, presented on a different or the same page as the original editor. For example, the instance of the editor shown in FIG. 4 may be presented as a result of clicking on the "view source" button within the representation of the pipe 1004 in the FIG. 10 example.

Figure 11:
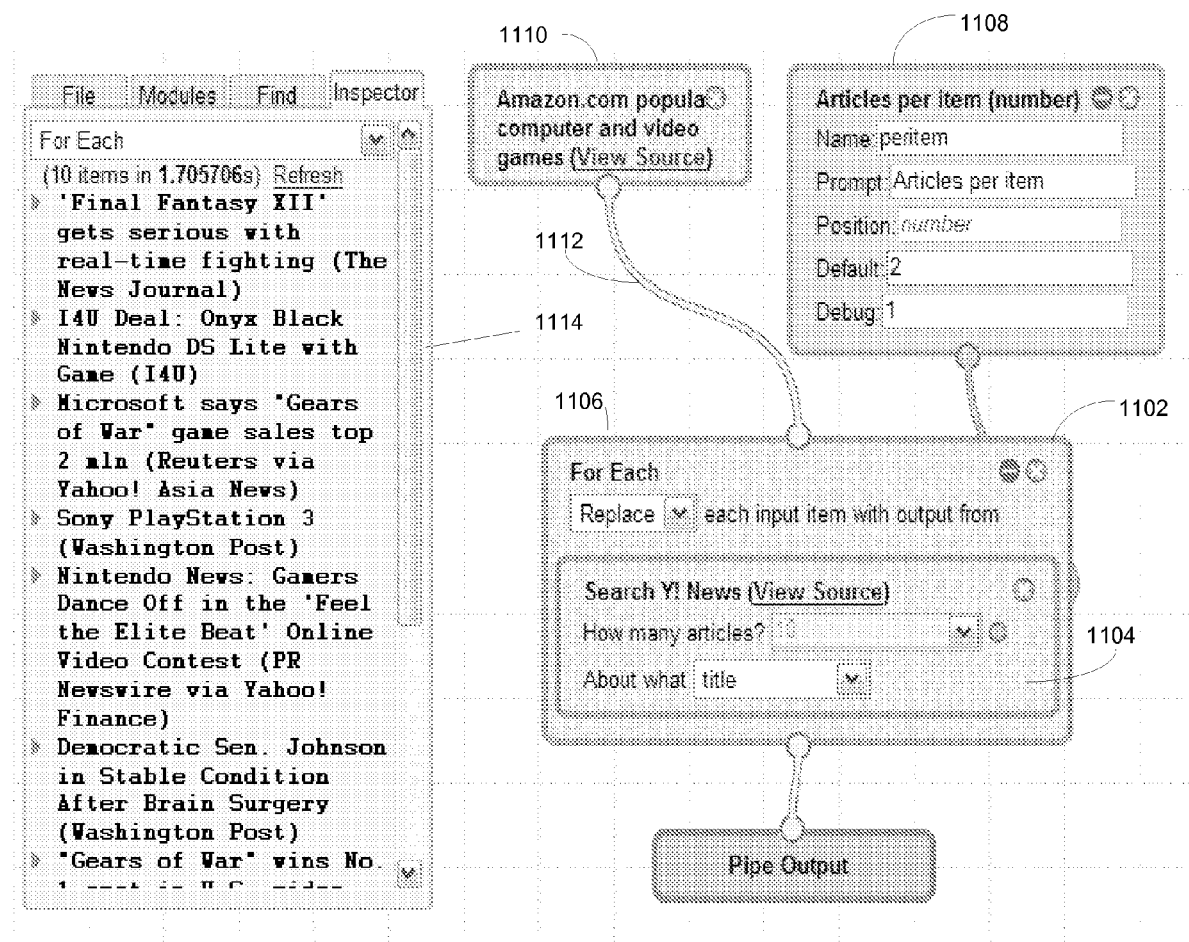
FIG. 11 illustrates another example of a "pipe within a pipe" that includes a "for each" functionality.

In another example of a "pipe within a pipe," shown in FIG. 11, the module 1102 (which may, in some examples, be a pipe of one or more pipes and/or one or more modules) includes a "for each" functionality (label designated by reference numeral 1106), which designates that the processing of the module 1104 (in this case, a preprogrammed "replace" functionality, which may be selected from a choice of preprogrammed functionalities; another example of a "for each" functional includes a preprogrammed "append" functionality) be carried out for each syndication data item input to the module 1102. In the FIG. 11 example, the output of the module 1102 is up to ten news stories, from Yahoo! News, about each popular computer and video game provided on the wire 1112 from the pipe 1110. The module 1108 is a user input module (like the user input module 502, in FIG. 5). The user input module 1108 provides facility for a user input selection in the "Position" field (which configures where the prompt appears on the host page at runtime of the pipe), while also providing a field for a programmable default value for the user input selection. In addition, a "debug" input is also provided, which may be used during a debug mode (another name for the "inspector" mode). In FIG. 11, a debug output 1114 of the module 1102 is shown.

Figure 5:
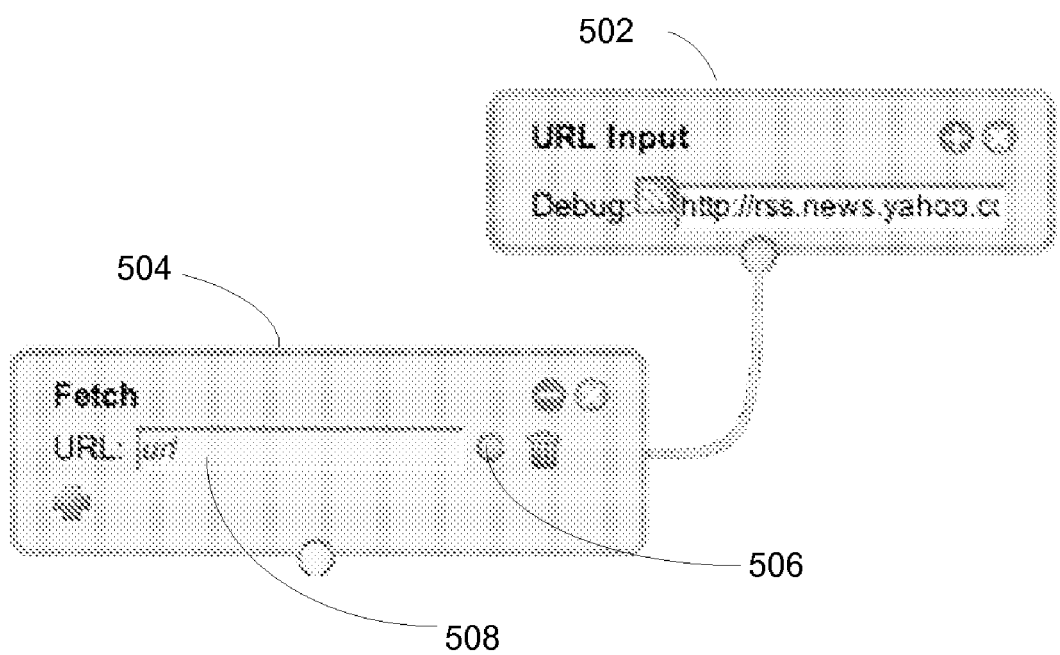
FIG. 5 illustrates an example of an input field of a fetch data source module being configured using a URL user input module.

User input modules, for providing user input to an input field of another module, are mentioned above. FIG. 5 illustrates an example of a user input module 502. There may be, for example, five types of user input modules: text input, number input, location input, date input and URL input. Each type of user input module handles a specific type of data and can only pass data of that type. FIG. 5 illustrates an example of an input field 508 of a "fetch" data source module 502 being configured using a URL user input module 504.

A user input module has a property that it can pass its data to an input data field in another module, and need not be configured to pass syndication feed data to an input node of a module. In one example, fields of modules that can accept input from a user input module are indicated by a particular icon 506 shown in FIG. 5. The user input field of a user input module may be accessible, such that users of the pipe may provide their own input (e.g., providing the ZIP code corresponding to the user's location) to customize or otherwise parameterize the execution of the pipe at runtime without necessarily otherwise modifying the pipe.

Having described components of a pipe, including modules and wires, we now more generally discuss pipes and some motivations for providing an editor with which pipes can be created and/or modified. A pipe may be thought of as a recipe to "cook up" a new syndication data feed. A pipe is an encapsulated set of modules that are wired together (e.g., using a GUI-based editor). As alluded to above, relative to individual modules, the parameter configurations of the modules of a pipe determine the behavior of the pipe when the pipe is "run."

In one example, at runtime, the modules of a pipe are interpreted and executed by a pipes platform engine. The pipes platform engine may be capable of carrying out processing of various modules in parallel. The processes in a pipe generally execute sequentially in one direction, toward the output module. The platform engine may normalize data in the pipe to conform to a syndication data feed protocol. A pipe generally only has one output (represented by the pipe output module).

While the output of a pipe conforms to a syndication data feed protocol, the feed data may generally be viewed a variety of different ways. For example, if a pipe output is GeoRSS data (or, more generally, conforms to a syndication data protocol having location data encoded therein), the syndication feed data items may be rendered on a map such as an interactive map (e.g., items are rendered as items that may be activated to go to the original source of that item).

In one example, the content may be rendered as a badge on another site using a badging station. That is, a badge is basically small pieces of code or HTML that can be added to a website, to display some content. The badging station is a service for a user to "create" those pieces of code that can be added to the web site, either by pasting it into the page, or by clicking on a button (e.g., like a button for "Add to my yahoo"). In this case the badging station provides a user with a mechanism to create the right badge for their site to personalize the look and feel and stylize the badge.

In another example, the output syndication data feed may be subscribed to using a feed reader. That is, in some examples, the syndication feed protocol may be thought of as merely a transport layer that enables the data to be viewed in any way that such syndication feed data may be viewed generally. However, any process that can receive a syndication data feed can receive the output syndication data feed of a pipe.

In general, then, a pipe may be thought of as a user-generated set of instructions, represented graphically with modules and wires, describing a series of sequential events for a pipes engine to execute. A pipe may be private, or a pipe may be published (thus making the pipe public). In one example, a published pipe can be freely examined, cloned and further customized.

We now more discuss, in greater detail, some details of an example pipes editor. In one example, the pipes editor is a web-based visual programming environment that is used to customize the sequence in which modules are connected together to construct a pipe. For example, the pipes editor may include a canvas, a toolbox, and navigation components.

The canvas is the graphical "canvas" where a pipe is constructed. For example, modules may be "dragged" and "dropped" onto the canvas to build a pipe. The toolbox provides access to tools used in the process of building a pipe, such as a file menu to name, describe, tab, publish, clone and save a pipe. The toolbox may also include a module library that provides access to components to construct a pipe. A find feed search box may ease the process of discovering feeds and published pipes to process. An "inspector" feature discussed generally above may provide a pull down menu with a list that represents each module on your canvas, such that selecting a module in the pull down menu list while the pipe is executing results in viewing the output of that module.

In one example, navigation components provide options to allow a pipe developer to manage the visual layout of the modules on the canvas. For instance, all modules may be collapsed to save space, expanded to show all their parameters, or center aligned to provide a cleaner visual layout.

In addition to building pipes from scratch, a hosted pipe mechanism may be provided via which to access a pipe built by another (or even by the user accessing it), published and thus made public. This may be a useful mechanism for quickly determining the output of a pipe, and may also provide a starting point for subscribing to a pipe via a feed reader, adding the output of a published pipe to a web site as a badge, viewing how the pipe was constructed and/or cloning some or all of the pipe for use or modification.

Figure 12:
FIG. 12 illustrates a portion of an editor display wherein browser functionality is provided to browse available pipes (which may include one or more modules and/or pipes).

FIG. 12 illustrates a portion 1200 of an editor display wherein browser functionality is provided to browse available pipes (which may include one or more modules and/or pipes). In the FIG. 12 example, the pipes are organized into categories based on characteristics of the pipes (in the FIG. 12 example, based on sources, operations, user inputs, popular and my favorites). Examples of other characteristics according to which the pipes may be presented and browsed may be user-defined and/or may include domain source, feed type, whether a pipe is related to a feed to which the user already subscribes, and whether a pipe or feed is subscribed to by others with which it is discernible the user has a relationship. Not only can pipes be accessed without using the editor but, the browser is "live" such that, for example, when another user saves a pipe, the pipe then becomes available via the browser functionality. In addition to the browser, a search function may also be provided, such that a user may search for a pipe based on various characteristics.

It can be seen, then, that uses of pipes are virtually unlimited. For example, unique and rich data mashups may be achieved by combing multiple data sets and transforming their content. In some examples, every pipe has its own unique syndication data feed locator (e.g., URL), which can make it possible to subscribe to a pipe using any feed reader. The output of a pipe may be distributed by adding the locator to a blog or to a website as a badge (mentioned above).

When the user desires to execute a pipe, that user can just click on the badge link. The user will be presented with the pipes badging station, including the ability to preview different badge formatting options, customize the badge's appearance, and get the code to add the badge to the user's web site where it is desired to appear. For example, if syndication data in an executing pipe includes GeoRSS information, the user may be able to choose from a variety of interactive map badges.

Figure 6:
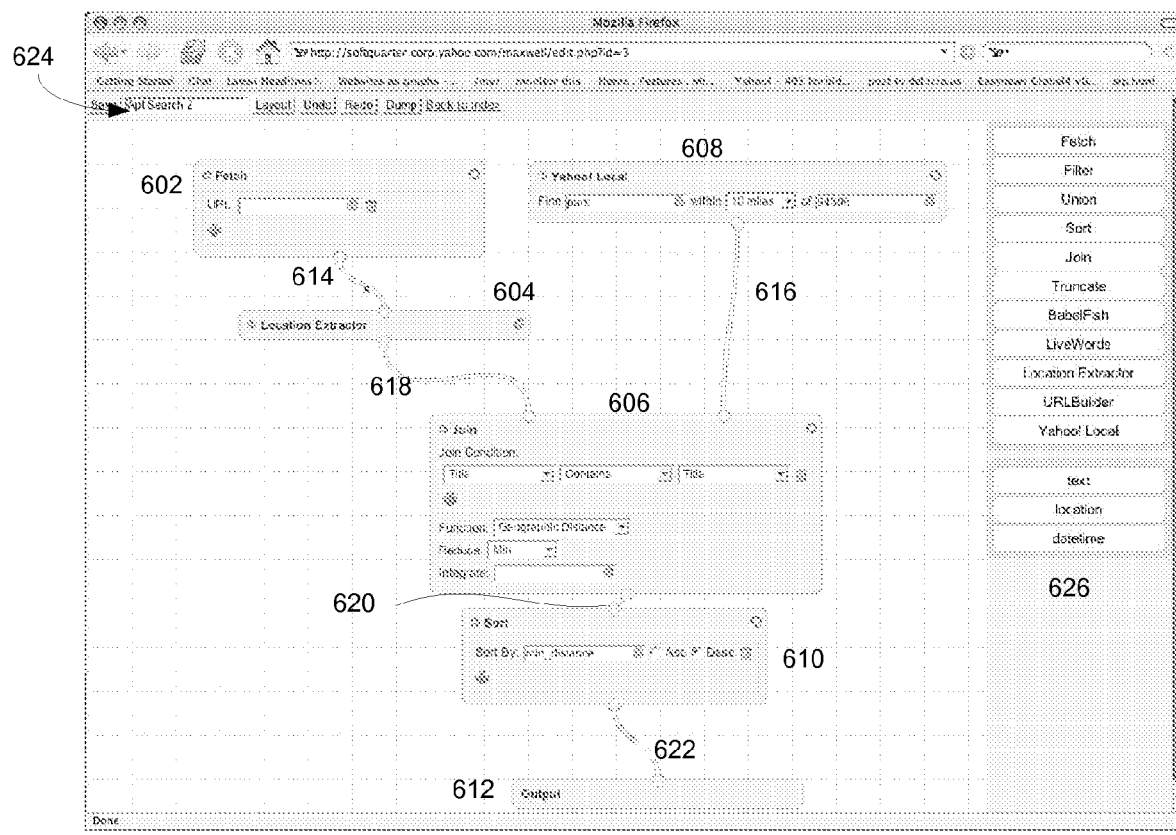
FIG. 6 illustrates an example pipe to, generally, provide a syndication data feed output that indicates apartment listings, within a particular geographical area, and that are near a park (even sorting the listings by the distance from a park).

FIG. 6 illustrates an example pipe to, generally, provide a syndication data feed output that indicates apartment listings, within a particular geographical area, and that are near a park (even sorting the listings by the distance from a park). Referring to FIG. 6, the modules may have been configured with the aid of a menu 626. In addition, the pipe is associated with the name "Apt Search 2" shown in the name box 624.

Turning to the pipe itself, the module 602 is configured to fetch apartment listings from, for example, an RSS feed provided by a classified listing service, such as "Craigslist." The output from the module 602 is provided on a wire 614 to a location extractor processing module 604. The location extractor processing module 604 provides the apartment locations on the wire 618. In addition (and in parallel, in some examples), a module 608 is utilized to access a service (or other data source) to provide locations of parks within the ZIP code 95306 and provide those locations on a wire 616.

A join function module 606 operates on the output of the wire 618 and the output of the wire 616 to provide, on the wire, 620, apartment listings that are found to be within a minimum distance from the location of a park. The sort module 610 sorts the apartment listings by distance from a park. The sorted listings are provided, on the wire 622, to the output module 612.

Figure 7:
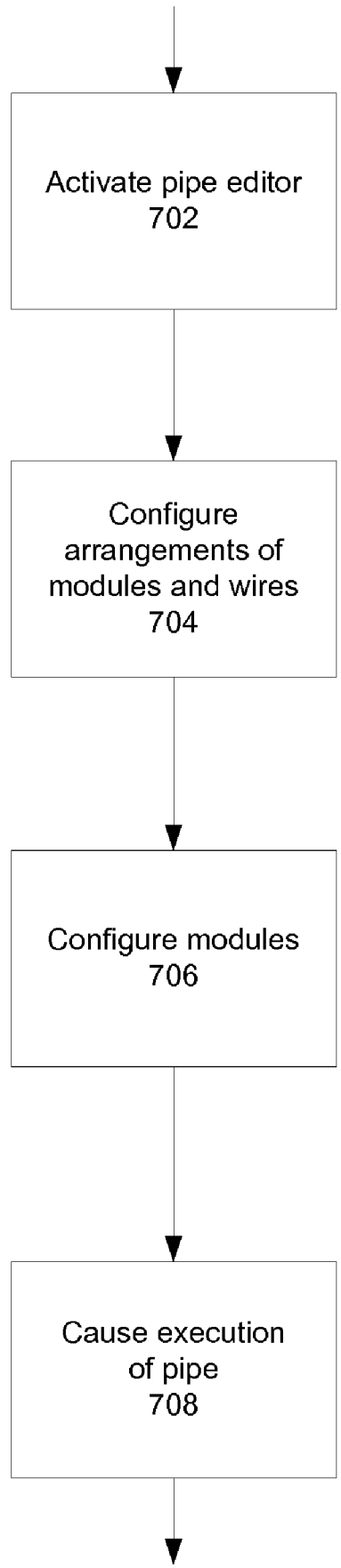
FIG. 7 is a flowchart illustrating an example of processing to set up and use a pipe.

FIG. 7 is a flowchart illustrating, in accordance with one example, processing to set up and use a pipe. At step 702, the pipe editor is activated. At step 704, the arrangement of modules and wires is configured (e.g., as discussed in some detail above). At step 706, the modules themselves are configured. At step 708, the thus-configured pipe is caused to be executed.

The editor may include functionality to control the visual layout of the constituent modules/pipes (and corresponding connectors) based at least in part on characteristics of the processing associated with the constituent modules/pipes. In one example, the visual layout is controlled so that the layout is based at least in part on a direction of data flow through the overall pipe. In one example, the representations of the constituent modules/pipes are visually laid out such that data flow corresponds generally to a top to bottom direction on the visual layout. The visual layout in some examples is controlled based on other or additional characteristics of the data being processed.

Figure 8:
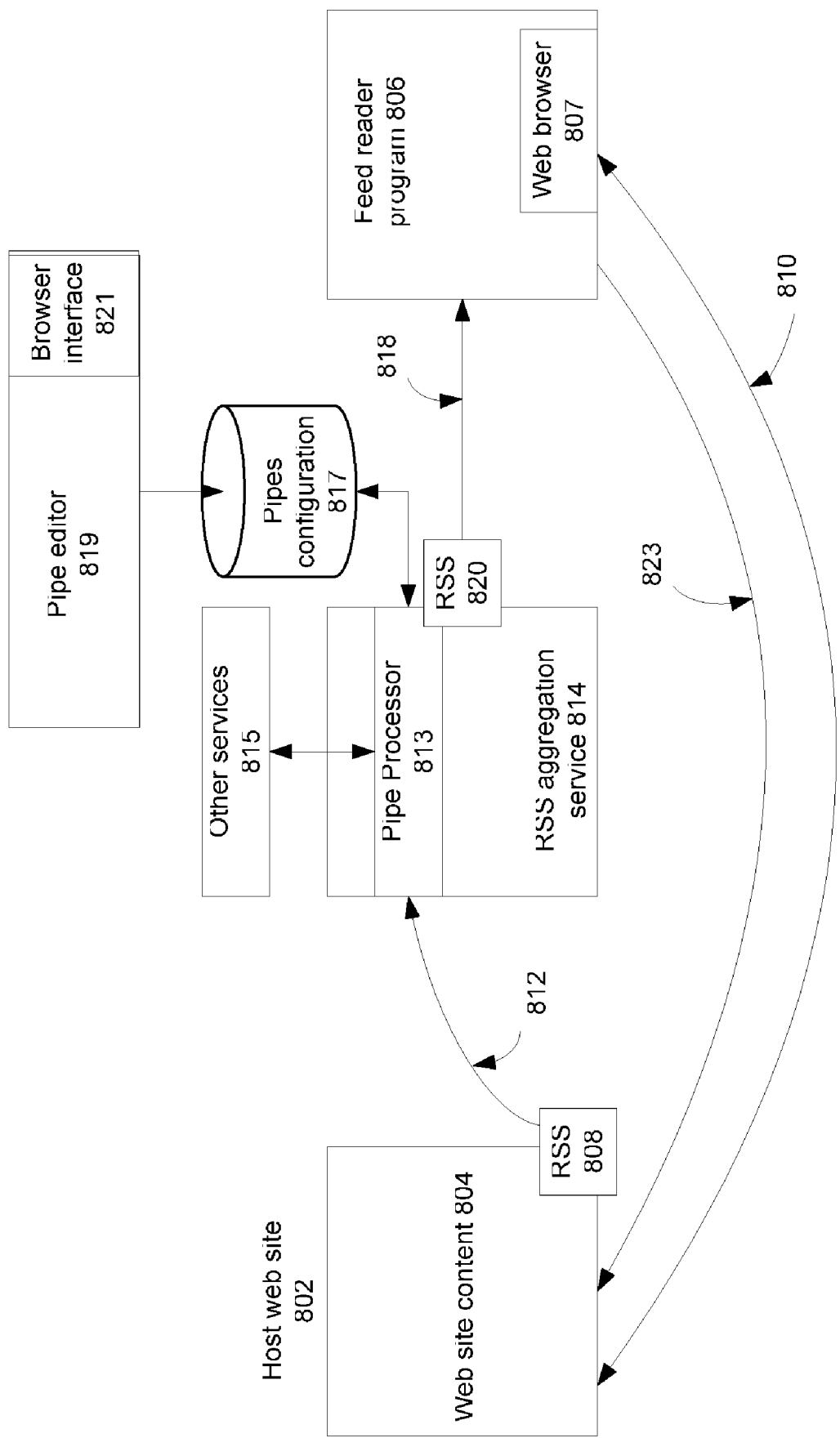
FIG. 8 is a block diagram illustrating an example architecture of a system in which a pipe editor and processor may be utilized.

FIG. 8 is a block diagram illustrating an example architecture of a system in which a pipe editor and processor may be utilized. Referring to FIG. 8, a host web site 802 is configured to provide web site content 804 based on a request from, for example, a web browser program 807. While FIG. 8 illustrates a single host web site 802, in a typical configuration, the system may include more (even many more) than a single host web site 802 configured to provide web content to the feed reader program 806 (which may be, for example, integrated as part of a web browser or other program, or a standalone program). A single host web site 802 is shown for simplicity of illustration only. Typically, a feed reader program 806 provides a user interface in which indications of syndication data feed items are displayed and, as a result of a user clicking on a portion of the display, an appropriate request is provided to a host web site.

The host web site 802 has associated with it an RSS module 808 (which, more generically, includes functionality to cause a syndication data feed to be provided). The RSS module 808 operates to cause an RSS feed 810 to be provided to an RSS aggregation service 814. In particular, the RSS feed 810 comprises a structured representation of the web page content 804 usable to form a request for particular portions of the web page content 804.

The RSS aggregation service 814 (or, in some examples, functionality associated with the RSS aggregation service, which may be a separate service) includes the pipe processor 813, which executes pipes stored in the pipes configuration storage 817 (such as, for example, "hosted pipes" authored and published for public use. In the course of executing pipes, the pipe processor 813 may also access "other services" as may be required based on the particular pipe being executed.

The syndication feed resulting from executing a pipe is provided via an RSS (or, more generically, syndication feed) module 820 output of the aggregation service 814 to the feed reader program 806 and, for example, indications of the RSS feeds are caused to be displayed by the feed reader program 806. For example, the aggregation service 814 may be part of a service known as MyYahoo®, which can provide a user-configurable web page including information corresponding to RSS feeds and pipes subscribed to by the MyYahoo® user.

While the discussion herein is in terms of "programs," it is noted that, in some examples, the described functionality may be accomplished by hardware, software, or some combination of both.

The user, using the feed reader program 806 to view the display including the indication of the RSS feeds, may activate one or more of the RSS feed indications to cause a request 823 corresponding to the RSS feed to be provided from the feed reader program 806. More particularly, the request is provided to a location indicated by a locator received by feed reader program 806 in association with the activated RSS feed indication.

Still referring to FIG. 8, a pipe editor 819 including a browser interface 821 may be utilized to generate and/or edit pipes in the pipes configuration storage 817, as discussed in detail above.

We have thus described a process by which one may effect the remixing of syndication data feeds to create, for example, a pipe. The created pipe, when executed (by, for example, a pipe engine of a hosted service, which may be, for example, web-based), results in syndication feed data "mashups" to combine content from more than one source, including at least one syndication data feed, into an integrated experience. We have described an example of a GUI editor to ease the authoring and use of such pipes.

What is claimed is:

1. A pipe specification editor computer program product to configure a pipe for processing a syndication data feed, the editor computer program product comprising a computer readable storage medium having computer program instructions stored therein which are operable to configure one or more computing devices to:

provide a graphical user interface to receive a user specification of a plurality of constituent pipes, each constituent pipe characterized by one or more pipes and/or modules, each constituent pipe characterized by an input node and an output node, wherein the input node is configured to input a syndication data feed and the output node is configured to output a syndication data feed; and at least one of the constituent pipes includes a module configured to retrieve a source syndication data feed, one or more of which includes a module to retrieve a source syndication data feed that is data representing content of a web page but is not itself the content of the web page;

wherein the input node and output node of a constituent pipe correspond to input nodes and output nodes of pipes and/or modules by which that pipe is characterized;

provide a graphical user interface to receive a user specification of wires to connect each of at least some of the output nodes to at least one input node, wherein the wires are configured to provide a syndication data feed provided from an output node of a constituent pipe to an input node of another constituent pipe; and save, as at least a portion of a pipe specification, an indication of the user specification of constituent pipes and wires.

2. The pipe specification editor computer program product of claim 1, wherein the computer program instructions further configure the one or more computing devices to:

save, as at least part of the portion of the pipe specification, a configuration for at least some pipe operating parameters.

3. The pipe specification editor computer program product of claim 1, wherein the computer program instructions further configure the one or more computing devices to:

receive an indication of user input to an input field of a pipe.

4. The pipe specification editor computer program product of claim 1, wherein the computer program instructions further configure the one or more computing devices to:

provide a user input menu graphical user interface to receive a user specification of a configuration for at least some of the pipe operating parameters.

5. The pipe specification editor computer program product of claim 1, wherein the computer program instructions further configure the one or more computing devices to:
execute the pipe specification; and
populate choices in a user input menu for a particular constituent pipe based on data input to that pipe as the pipe specification is executed.

6. The pipe specification editor computer program product of claim 1, wherein the computer program instructions further configure the one or more computing devices to:
configure an inspector to display an indication of data existing at a portion of the pipe as the pipe is executed.

7. The pipe specification editor computer program product of claim 6, wherein:
the display is on a same page as the page used with respect to specifying the original pipe.

8. The pipe specification editor computer program product of claim 6, wherein:
the display of an indication of data is updated as the pipe is executed.

9. The pipe specification editor computer program product of claim 1, wherein the computer program instructions further configure the one or more computing devices to:
configure an inspector to display an indication of data existing within a wire of the pipe as the pipe is executed.

10. The pipe specification editor computer program product of claim 1, wherein:
at least one of the pipes is a user input pipe configured to, when the pipe is executed, provide module operating parameters to another pipe.

11. The pipe specification editor computer program product of claim 1, wherein the computer program instructions further configure the one or more computing devices to:
as the pipe is executed, provide a graphical interface that, for the pipe to which pipe operating parameters are provided, causes display of an indication of the provided pipe operating parameters in association with an indication of that pipe.

12. The pipe specification editor computer program product of claim 1, wherein the computer program instructions further configure the one or more computing devices to:
cause the execution of the pipe specification.

13. The pipe specification editor computer program product of claim 1, wherein the computer program instructions to configure the one or more computing devices to cause execution of the pipe specification include:
computer program instructions to configure the one or more computing devices to execute an interpreter of instructions corresponding to the pipe specification, as the pipe specification is executed.

14. The pipe specification editor computer program product of claim 1, wherein the computer program instructions further configure the one or more computing devices to:
cause another instance of the pipe specification computer program to execute with respect to a constituent pipe.

15. The pipe specification editor computer program product of claim 1, wherein the computer program instructions further configure the one or more computing devices to:
provide a user interface via which a user may browse available pipes for use as a constituent pipe.

16. A pipe specification editor system to configure a pipe for processing a syndication data feed, the editor system including one or more computing devices configured to:

provide a graphical user interface to receive a user specification of a plurality of constituent pipes, each constituent pipe characterized by one or more pipes and/or modules, each constituent pipe characterized by an input node and an output node, wherein
the input node is configured to input a syndication data feed and the output node is configured to output a syndication data feed; and
at least one of the constituent pipes includes a module configured to retrieve a source syndication data feed, one or more of which includes a module to retrieve a source syndication data feed that is data representing content of a web page but is not itself the content of the web page;
wherein the input node and output node of a constituent pipe correspond to input nodes and output nodes of pipes and/or modules by which that pipe is characterized;
provide a graphical user interface to receive a user specification of wires to connect each of at least some of the output nodes to at least one input node, wherein the wires are configured to provide a syndication data feed provided from an output node of a constituent pipe to an input node of another constituent pipe; and
save, as at least a portion of a pipe specification, an indication of the user specification of constituent pipes and wires.

17. The pipe specification editor system of claim 16, wherein the one or more computing devices are further configured to:
save, as at least part of the portion of the pipe specification, a configuration for at least some pipe operating parameters.

18. The pipe specification editor computer program product of claim 16, wherein the one or more computing devices are further configured to:
receive an indication of user input to an input field of a pipe.

19. The pipe specification editor system of claim 16, wherein the one or more computing devices are further configured to:
provide a user input menu graphical user interface to receive a user specification of a configuration for at least some of the pipe operating parameters.

20. The pipe specification editor system of claim 16, wherein the one or more computing devices are further configured to:
execute the pipe specification; and
populate choices in a user input menu for a particular constituent pipe based on data input to that pipe as the pipe specification is executed.

21. The pipe specification editor system of claim 16, wherein the one or more computing devices are further configured to:
configure an inspector to display an indication of data existing at a portion of the pipe as the pipe is executed.

22. The pipe specification editor system of claim 21, wherein:
the display is on a same page as the page used with respect to specifying the original pipe.

23. The pipe specification editor system of claim 21, wherein:
the display of an indication of data is updated as the pipe is executed.

24. The pipe specification editor system of claim 16, wherein the one or more computing devices are further configured to:
configure an inspector to display an indication of data existing within a wire of the pipe as the pipe is executed.

25. The pipe specification editor system of claim 16, wherein:
  at least one of the pipes is a user input pipe configured to, when the pipe is executed, provide module operating parameters to another pipe.

26. The pipe specification editor system of claim 16, wherein the one or more computing devices are further configured to:
  as the pipe is executed, provide a graphical interface that, for the pipe to which pipe operating parameters are provided, causes display of an indication of the provided pipe operating parameters in association with an indication of that pipe.

27. The pipe specification editor system of claim 16, wherein the one or more computing devices are further configured to:
  cause the execution of the pipe specification.

28. The pipe specification editor system of claim 16, wherein the one or more computing devices being configured to cause execution of the pipe specification includes:
  the one or more computing devices being configured to execute an interpreter of instructions corresponding to the pipe specification, as the pipe specification is executed.

29. The pipe specification editor system of claim 16, wherein the one or more computing devices are further configured to:
  cause another instance of the pipe specification computer program to execute with respect to a constituent pipe.

30. The pipe specification editor system of claim 29, wherein:
  the one or more computing devices being configured to cause another instance of the pipe specification computer program to execute includes being configured to cause the other instance of the pipe specification editor system to execute using a page separate from a page used with respect to specifying the original pipe.

31. The pipe specification editor system of claim 29, wherein:
  being configured to cause another instance of the pipe specification editor system to execute includes being configured to cause the other instance of the pipe specification editor system to execute using a same page as the page used with respect to specifying the original pipe.

32. The pipe specification editor system of claim 16, wherein the one or more computing devices are further configured to:
  provide a user interface via which a user may browse available pipes for use as a constituent pipe.

33. The pipe specification editor system of claim 16, wherein the one or more computing devices are configured to provide the user interface to a plurality of user, wherein the pipe specification are sharable among a community of users.

34. A pipe specification execution computer program product comprising a computer readable storage medium having computer program instructions stored therein which are operable to configure one or more computing devices to cause the execution of the pipe specification, including to configure the one or more computing devices to:
  interpret instructions corresponding to constituent pipe specifications and at least one wire specification which the pipe specification comprises, wherein
    each constituent pipe is characterized by at least one of a group consisting of an input node and an output node, such that
      the input node, if present, is configured to input a syndication data feed and the output node, if present, is configured to output a syndication data feed; and
    at least one of the constituent pipes includes a module configured to retrieve a source syndication data feed, one or more of which includes a module to retrieve a source syndication data feed that is data representing content of a web page but is not itself the content of the web page;
  the wires are configured to connect each of at least some of the output nodes to at least one input node, including to provide a syndication data feed provided from an output node of a constituent pipe to an input node of another constituent pipe; and
  the input node and output node of a constituent pipe correspond to input nodes and output nodes of pipes and/or modules by which that pipe is characterized; and
  execute instructions of the one or more computing devices corresponding to the interpreted instructions to generate an output syndication data feed corresponding to the pipe specification and syndication data input to the execution of the pipe specification.

35. At least one computer readable storage medium having tangibly embodied therein a collection of computer-readable pipe specifications, each pipe specification including computer-interpretable instructions specifying constituent pipes and wires, wherein for each pipe specification,
  the pipe specifications are characterized by at least one of a group consisting of an input node and an output node, such that
    the input node, if present, is configured to input a syndication data feed and the output node, if present, is configured to output a syndication data feed; and
  at least one of the constituent pipes includes a module configured to retrieve a source syndication data feed, one or more of which includes a module to retrieve a source syndication data feed that is data representing content of a web page but is not itself the content of the web page;
  the wires are configured to connect each of at least some of the output nodes to at least one input node, including to provide a syndication data feed provided from an output node of a constituent pipe to an input node of another constituent pipe.

36. A method of creating a pipe specification to configure a plurality of constituent pipes for processing a syndication data feed, comprising:
  receive, via a user interface, specification of a plurality of constituent pipes, each constituent pipe characterized by at least one of a group consisting of an input node and an output node, wherein
    the input node, if present, is configured to input a syndication data feed and the output node, if present, is configured to output a syndication data feed; and
  at least one of the constituent pipes includes a module configured to retrieve a source syndication data feed, one or more of which includes a module to retrieve a source syndication data feed that is data representing content of a web page but is not itself the content of the web page;
  receive, via a user interface, specification of wires to connect each of at least some of the output nodes to at least one input node, wherein the wires are configured to provide a syndication data feed provided from an output node of a constituent pipe to an input node of another constituent pipe; and
  save, as at least a portion of a pipe specification, an indication of the specified modules and wires.

* * * * *